United States Patent [19]

Kemp

[11] Patent Number: 4,880,524
[45] Date of Patent: Nov. 14, 1989

[54] PROCESS FOR HYDROTREATING HYDROCARBON FEEDS

[75] Inventor: Richard A. Kemp, Stafford, Tex.

[73] Assignee: Shell Oil Company, Houston, Tex.

[21] Appl. No.: 288,498

[22] Filed: Dec. 19, 1988

Related U.S. Application Data

[62] Division of Ser. No. 123,510, Nov. 20, 1987, Pat. No. 4,820,679.

[51] Int. Cl.$^4$ .............................................. C10G 45/08
[52] U.S. Cl. ........................ 208/216 PP; 208/251 H; 208/254 H
[58] Field of Search ................ 208/217, 218 PP, 213, 208/251 H, 254 H

[56] References Cited

U.S. PATENT DOCUMENTS

| | | | |
|---|---|---|---|
| 2,894,900 | 7/1959 | Hemminger | 208/135 |
| 3,124,418 | 3/1964 | Malley et al. | 23/143 |
| 3,338,819 | 8/1967 | Wood | 208/97 |
| 3,520,654 | 7/1970 | Carr et al. | 23/143 |
| 3,766,058 | 10/1973 | Hensley | 208/210 |
| 3,798,176 | 3/1974 | Ao | 252/437 |
| 3,864,461 | 2/1975 | Miller et al. | 423/628 |
| 3,879,310 | 4/1975 | Rigge et al. | 252/435 |
| 3,897,365 | 7/1975 | Feins et al. | 252/435 |
| 3,969,273 | 7/1976 | Brown et al. | 252/435 |
| 4,003,828 | 1/1977 | Eberly, Jr. | 208/251 H |
| 4,019,978 | 4/1977 | Miller et al. | 208/213 |
| 4,066,572 | 1/1978 | Choca | 252/437 |
| 4,154,812 | 5/1979 | Sanchez et al. | 423/626 |
| 4,202,798 | 5/1980 | Johnson et al. | 252/437 |
| 4,588,706 | 5/1986 | Kukes et al. | 502/211 |
| 4,624,938 | 11/1986 | Kemp | 502/208 |
| 4,629,716 | 12/1986 | Kemp | 502/208 |
| 4,716,140 | 12/1987 | Kemp | 502/211 |
| 4,716,141 | 12/1987 | Kemp | 502/211 |
| 4,717,698 | 1/1988 | Kemp | 502/211 |
| 4,717,704 | 1/1988 | Kemp | 502/211 |
| 4,717,705 | 1/1988 | Kemp | 502/211 |
| 4,717,706 | 1/1988 | Kemp | 502/211 |
| 4,717,707 | 1/1988 | Kemp | 502/211 |
| 4,786,403 | 11/1988 | Kemp | 208/217 |
| 4,786,404 | 11/1988 | Kemp | 208/217 |

*Primary Examiner*—Paul E. Konopka
*Attorney, Agent, or Firm*—Pamela J. McCollough

[57] ABSTRACT

This invention relates to hydrotreating with highly active catalysts prepared by incorporating from nickel and a heavy metal selected from the group consisting of molybdenum, tungsten and mixtures thereof. The final calcined catalysts have surface areas at least about 300 m$^2$/g and at least about 70% of the pore volume in pores having diameters less than about 70 Å.

36 Claims, No Drawings

PROCESS FOR HYDROTREATING HYDROCARBON FEEDS

This is a division of application Ser. No. 123,510, filed Nov. 20, 1987, now Pat. No. 4,820,679.

FIELD OF THE INVENTION

This invention relates to a process for preparing highly active alumina hydrogel-derived catalysts.

BACKGROUND OF THE INVENTION

In the catalytic processing of petroleum feedstocks, it is often desirable to alter the pore structure of the catalyst in order to accommodate different types of feeds. For example, when processing feedstocks of high metals content, the metals tend to deposit rapidly on the catalyst surface and plug the pores of conventional hydroprocessing catalysts, resulting in a loss of catalytic activity for sulfur removal. To facilitate the diffusion of large components into and out of the catalyst and to prevent surface deposits of coke and metals, large pore diameters are required. On the other hand, when processing feedstocks with no metals or with low metals contents, it may be technically and economically desirable to use a narrow-pore catalyst. The catalysts prepared according to the present invention are narrow-pore catalysts which have high desulfurization and hydrogenation activities.

It is known that in certain hydrocracking operations the hydrocracked products are contaminated with mercaptans, even in cases where the initial feed placed in the hydrocracking zone is free of mercaptans. There is, therefore, a need to eliminate mercaptans from the hydrocracked products. In addition to being useful for a variety of hydrotreating applications in which high desulfurization and hydrogenation activities are required, the catalysts of the instant invention are particularly useful as a non-acidic post-treatment for hydrocracked products which are contaminated with mercaptans. These mercaptans are apparently synthesized during or after hydrocracking operations by the reaction of olefins with hydrogen sulfide, as exemplified by the equation:

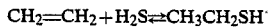

$$CH_2=CH_2 + H_2S \rightleftharpoons CH_3CH_2SH$$

This reaction is catalyzed by the acidic nature of the hydrocracking catalysts used in the hydrocracking zone. It has been found that the catalysts prepared according to the invention, which have high hydrogenation and desulfurization abilities, prevent the reaction of olefins and hydrogen sulfide to mercaptans by hydrogenating the olefins, or, alternatively, reduce the concentration of the mercaptans which are formed by conventional desulfurization.

SUMMARY OF THE INVENTION

The present invention relates to a process for the preparation of catalysts containing nickel and an element selected from the group consisting of molybdenum, tungsten and mixtures thereof, incorporated into an alumina hydrogel. These catalysts are prepared by a process which comprises:

(a) titrating an aqueous solution of an acid aluminum salt with an aqueous solution of a basic aluminum compound, thereby forming a precipitate, (b) aging the precipitate at a temperature ranging from about 20° C. to about 90° C. for at least about 15 minutes at a pH ranging from about 8.0 to about 12.0, (c) washing the precipitate, (d) mixing the precipitate with nickel and a heavy metal selected from the group consisting of molybdenum, tungsten, and mixtures thereof, at a pH in the range between about 4.0 and about 10.0 and a temperature in the range between about 25° C. and about 100° C. until adsorption of the metal salts onto the gel is sufficient to yield a final catalyst having from about 1%w to about 6%w nickel and from about 8%w to about 40%w heavy metal, (e) extruding the product of step (d), and (f) drying and calcining the product of step (e) at a temperature ranging from about 300° C. to about 900° C.

It has been found that hydrogel-derived catalysts prepared according to the invention have activities better than catalysts prepared by conventional techniques when compared on a volumetric basis. One of the major advantages of the hydrogel preparative technique is lower cost of catalyst manufacture relative to conventionally prepared impregnated catalysts even with the hydrogel catalysts having higher densities. The catalysts prepared according to the invention have high surface areas, at least about 300 m²/g, and at least about 70% of the pore volume located in pores having diameters less than about 70 Å. These catalysts are particularly suitable for tail end hydrocracking and hydrotreating applications in which high desulfurization activities and high hydrogenation abilities are desired.

DESCRIPTION OF THE PREFERRED EMBODIMENTS

In the process of the instant invention, a highly active catalyst is prepared by incorporating nickel and a heavy metal selected from the group consisting of molybdenum, tungsten and mixtures thereof, into an alumina hydrogel prepared by titrating an aqueous solution of one or more aluminum salt(s) with a titrating agent.

The alumina hydrogel can be prepared by titrating an aqueous solution of one or more aluminum salt(s) with an appropriate acidic or basic material or solution as titrating agent to cause precipitation of the alumina gel. One skilled in the art will recognize that the alumina gel can be prepared by titrating an acidic aluminum salt such as, for example, aluminum sulfate, aluminum nitrate, or aluminum chloride, in aqueous solution with a basic precipitating medium such as, for example, sodium hydroxide or ammonium hydroxide, or, by titrating an alkali metal aluminate such as, for example, sodium aluminate or potassium aluminate, in aqueous solution with an acidic precipitating medium such as, for example, hydrochloric acid or nitric acid. One skilled in the art will recognize that the adjustment of the pH of an aluminum-containing solution to between about 5.5 and about 10.0 will result in precipitation of the aluminum as aluminum hydroxide or hydrated aluminum oxide.

In a preferred embodiment, the alumina hydrogel is prepared by titrating an aqueous solution of an alkali metal aluminate and an aqueous solution of an acid aluminum salt to cause precipitation of the alumina gel. Suitable acidic aluminum salts include aluminum sulfate, aluminum nitrate and aluminum chloride. A preferred species is aluminum sulfate. Suitable alkali metal aluminates are sodium aluminate and potassium aluminate. The precipitation can be carried out by adding an aqueous solution of the basic aluminum species to an aqueous solution of the acidic aluminum species or the procedure can be reversed by adding an aqueous solution of the acidic aluminum species to an aqueous solution of the basic aluminum species (referred to as "sequential precipitation"). Preferably, the precipitation in the instant invention is carried out by simultaneously adding the acid aluminum species and the basic aluminum species to cause precipitation of the hydrogel (referred to as "simultaneous precipitation"). The maximum rate of addition of the acid aluminum species and the basic aluminum species is fixed by the rate at which the two streams can be mixed and the pH and temperature of the system can be effectively controlled.

The ranges and limitations provided in the instant specification and claims are those which are believed to particularly point out and distinctly claim the instant invention. It is, however, understood that other ranges and limitations that perform substantially the same function in substantially the same manner to obtain the same or substantially the same result are intended to be within the scope of the instant invention as defined by the instant specification and claims.

The temperature and pH of the precipitation are important variables in the preparation of the aluminas into which metals can be incorporated to form catalysts with desirable physical qualities. One skilled in the art would recognize that changes in precipitation temperatures and pHs result in changes in porosities. The optimal temperatures and pHs for the precipitation of the aluminas can be determined with a minimal amount of routine experimentation. In the instant invention, a precipitation temperature typically ranges from about 20° C. to about 90° C., preferably from about 50° C. to about 85° C., more preferably from about 55° C. to about 65° C., and a precipitation pH typically ranges between about 5.5 and about 10.0, preferably between about 5.5 and about 8.0, and more preferably between about 6.0 and about 7.5. The length of time required for the precipitation step is typically from about 15 minutes to about 45 minutes. The period of time for the precipitation should be sufficiently long of adequate mixing of the materials, but not long enough for enhanced particle growth to occur.

After the precipitation step is completed, the pH of the slurry is adjusted to a pH in the range from about 8.0 to about 12.0, preferably about 10.0 to about 12.0, more preferably about 11.0 to about 12.0, and aged at a temperature in the range from about 20° C. to about 90° C., preferably about 50° C. to about 85° C. for at least about 15 minutes. An upper limit on the length of time for aging is not critical and is normally determined by economical considerations. Aging times will typically range from about 0.1 to about 10 hours, preferably from about 0.25 to about 5 hours, and more preferably from about 0.25 to about 1 hour. In general, aluminas with acceptable properties are produced by holding the aging temperature equal to the precipitation temperature.

After aging, the slurry is washed and filtered in routine fashion to remove substantially all of the removable water-soluble salts formed during the precipitation of the hydrogel. The preferred solvent for washing is water although other solvents such as lower alkanols may be utilized.

After washing, the metals are incorporated into the hydrogel. One method for adding the metals to the hydrogel is a reslurry step in which the hydrogel is reslurried with a metals solution containing solubilized salts of nickel and a heavy metal selected from the group consisting of molybdenum, tungsten and mixtures thereof, sufficient to deposit on the final catalyst from about 1%w to about 6%w nickel and from about 8%w to about 22%w molybdenum or about 10%w to about 40%w tungsten. When mixtures of molybdenum and tungsten are utilized, the final catalyst contains from about 8%w to about 40%w molybdenum and tungsten. The solution may, however, contain amounts of nickel and molybdenum or tungsten in excess of that required to deposit the aforesaid amounts of metals, which excess may be removed by washing or other techniques following the reslurry step. A typical metals solution can be prepared by combining a molybdenum and/or tungsten solution with a nickel solution.

The molybdenum solution consists of a water-soluble source of molybdenum oxide such as ammonium heptamolybdate or ammonium dimolybdate dissolved in water. Hydrogen peroxide may also be used to aid in solution preparation in some cases. A preferred method for preparing the molybdenum solution consists of adding hydrogen peroxide to the solution in the range of about 0.1 to about 1.0 mole of hydrogen peroxide per mole of molybdenum. Optionally, a suitable soluble amine compound such a monoethanolamine, propanolamine or ethylenediamine can be added to the molybdenum solution in order to aid in stabilization of the solution.

The tungsten solution typically consists of ammonium metatungstate dissolved in water. A preferred method for preparing the tungsten solution consists of adding hydrogen peroxide to the solution in an amount ranging from about 0.1 to about 1.0 mole of hydrogen peroxide per mole of tungsten. In addition, a suitable soluble amine compound such as monoethanolamine, propanolamine or ethylenediamine can optionally be added to the tungsten solution in order to aid in stabilization of the solution.

The nickel solution consists of nickel salts dissolved in water. A wide range of nickel compounds are suitable, such as nickel nitrate, nickel acetate, nickel formate, nickel sulfate, nickel oxide, nickel phosphate, nickel carbonate, nickel chloride, and nickel hydroxide. Two compounds that are especially useful are nickel nitrate and nickel carbonate.

An alternative method for incorporating the metals into the hydrogel is to add dry, water-soluble metal salts of nickel and dry water-soluble salts of a heavy metal selected from the group consisting of molybdenum, tungsten and mixtures thereof, to the hydrogel and mix until dissolution and adsorption of the metal salts onto the gel is substantially complete. The metal salts of nickel and molybdenum and/or tungsten are added to the hydrogel in amounts sufficient to incorporate into the final catalyst from about 1%w to about 6%w nickel and from about 8%w to about 22%w molybdenum or about 10%w to about 40%w tungsten. When mixtures of molybdenum and tungsten are utilized, the final catalyst contains about 8%w to about 40%w molybdenum and tungsten.

Molybdenum is generally added to the hydrogel as a dry, watersoluble source of molybdenum such as ammonium heptamolybdate or ammonium dimolybdate. Tungsten is typically added to the hydrogel as ammonium metatungstate. Nickel is preferably added to the hydrogel in the form of dry, water-soluble nickel nitrate, nickel acetate, nickel formate, nickel sulfate, nickel oxide, nickel phosphate, nickel carbonate, nickel chloride or nickel hydroxide, with nickel nitrate and nickel carbonate being preferred.

A preferred method of mixing the dry metal salts of nickel and molybdenum and/or tungsten with the hydrogel consists of adding hydrogen peroxide to the mixture of dry metal salts and hydrogel in an amount ranging from about 0.1 to about 1.0 mole of hydrogen peroxide per mole of molybdenum and/or tungsten. Optionally, a suitable amine compound such a monoethanolamine, propanolamine or ethylenediamine may be added to the mixture of dry metal salts and hydrogel in order to aid in stabilization of the mixture of the metal salts and the hydrogel.

The dry metal salts of nickel and molybdenum and/or tungsten are typically added to the hydrogel in the form of finely divided particles which are generally 100 mesh or less in size. While particle size is not critical and larger particle sizes may be utilized, it is economically advantageous to use particles which are 100 mesh or less in size.

It is also within the scope of this invention to combine the two methods described above for adding the metals to the hydrogel. For example, one metal may be added to the hydrogel as a dry salt and another added in the form of a solution. Various permutations of this combination of dry salts additions and metals solutions additions would be obvious to one skilled in the art.

The temperature and pH of the step in which the metals solutions and/or the dry metal salts are mixed with the hydrogel are important variables in the preparation of hydrogel-derived catalysts which have acceptable densities and porosities. The mixing of the hydrogel with the metals solution or the dry metal salts is carried out at a pH in the range between about 4.0 and about 10.0, preferably between about 4.0 and about 9.0, more preferably between about 5.0 and about 8.0, and a temperature in the range between about 25° C. and about 100° C., preferably between about 25° C. and about 80° C., until incorporation of the metals salts into the gel is sufficient to yield a final calcined catalyst having from about 1%w to about 6%w nickel and from 8%w to about 40%w heavy metal selected from the group consisting of molybdenum, tungsten and mixtures thereof. Typically, the times for mixing the hydrogel and the metals will range from about 0.5 to about 2 hours. Optionally, the resulting material can be washed to remove unadsorbed metals and filtered in routine fashion.

Following the addition of metals to the hydrogel, the material may be extruded and then dried and calcined; dried, mulled with addition of water, extruded or pelleted and calcined; or partially dried, extruded or pelleted, dried more completely and calcined. Drying is accomplished by conventional means. It may be carried out by forced draft drying, vacuum drying, air drying or similar means. Drying temperatures are not critical and depend upon the particular means utilized for drying. Drying temperatures will typically range from about 50° C. to about 150° C.

In a preferred embodiment, the material is extruded and then dried. Alternatively, the material may be extruded after drying to the proper loss on ignition (LOI). In order to facilitate extrusion, organic binders and/or lubricants may be added prior to extrusion.

After drying, the material is calcined to produce the finished catalyst. The material may be calcined in an atmosphere, reducing, oxidizing or neutral, although air is preferred. However, if binders and/or lubricants are used the material is heated in an oxygen-containing atmosphere, preferably air, in order to burn out the binders and lubricants. Calcining temperatures will typically range from about 30)° C. to about 900° C. Burn-out temperatures will depend on the concentration of oxygen in the burn-out atmosphere as well as the burn-out time involved. Typically, burn-out temperatures will range from about 300° C. to about 900° C. Drying, calcining and burn-out may be combined in one or two steps. Most frequently the calcining and/or burn-out steps are combined using an oxygen-containing atmosphere.

Certain other processing steps may be incorporated into the above-described procedure without deviating from the scope and intent of his invention. For example, prior to the complete drying of the catalyst, it may be extruded and then dried more completely, followed by calcination.

The final catalysts are found to have surface areas greater than about 300 m$^2$/g, pore volumes ranging from about 0.2 to about 1.2 cc/g and with at least about 70% of its pore volume in pores having diameters less than about 70 Å, preferably less than about 50 Å. In general, the metals contents of the final catalysts range from about 1%w to about 6%w, preferably from about 3%w to about 5%w nickel and from about 8%w to about 22%w, preferably about 14%w to about 20%w molybdenum or about 10%w to about 40%w, preferably about 18%w to about 32%w tungsten.

The catalysts prepared in the instant invention can be suitably applied to hydrocarbon conversion processes such as hydrocracking, hydrotreating, hydrogenation, dehydrogenation, alkylation, dealkylation and the like.

The catalysts of the instant invention are most commonly employed in hydrotreating and/or hydrocracking feedstocks ranging in volatiles from naphthas to petroleum residues, including materials derived from tar sands, shale oils and the like. Reaction temperatures will typically range from about 300° F. to about 900° F., preferably from about 500° F. to about 850° F. Reaction pressures are generally within the range of about 200 psig to about 3500 psig, preferably from about 600 psig to about 2500 psig. Reactions are conducted at liquid hourly space velocities within the range of about 0.05 to about 15 reciprocal hour.

Multiple uses of these feedstocks after treating with the catalysts of this invention are possible. Depending on the particular feedstocks treated, suitable uses can include conversion unit feedstocks such as thermal cracking and hydrocracking, or finished products such as gasoline, diesel, airline turbine fuel, furnace oils, solvents, fuel oils and asphalts.

The process for preparing the catalysts of the instant invention will be further described below by the following examples which are provided for illustration and which are not to be construed as limiting the invention.

EXAMPLE 1

Seven hundred and forty grams of reagent grade sodium aluminate were added to 1000 grams of water which was then heated to 60° C. in order to effect dissolution of the materials. Seven hundred and thirty grams of $Al_2(SO_4)_3 \cdot 17 H_2O$ were added to 760 grams of water. Both solutions were cooled to slightly less than 60° C. and placed in dropping funnels.

Five thousand grams of water were added to a 10 liter stainless steel bucket equipped with a pH meter, thermometer and stirrer, to serve as the heel. The two solutions in the dropping funnels were added simultaneously to the well-stirred bucket until the aluminum sulfate solution was exhausted, maintaining a precipitation pH of 7.0. The remainder of the sodium aluminate solution was added to raise the final aging pH of the solution to between 11.0 to 12.0. The solution was aged for one hour at 60° C. The resulting material was filtered and washed in two large Buchner funnels with about 50 liters of water. The excess water from the wet filter cake was removed by vacuum. The hydrogel was then divided into two equal portions.

The following solutions were then prepared. 45.9 Grams of nickel nitrate as hexahydrate was diluted to 750 milliliters with water. An additional solution of 68.1 grams of ammonium heptamolybdate and 10.5 ml of 30% hydrogen peroxide were diluted to 750 milliliters with water. The two solutions were added and reslurried with one-half of the hydrogel at 80° C. for two hours at pH of 5.5. At the tend of two hours, the slurry was filtered and washed with three liters of water. The excess water from the slurry was removed by vacuum. The wet gel was then extruded using a small, hand-held extruder using a 0.156″ cylindrical die, dried overnight at 120° C. and calcined in air at 510° C. The properties of the catalyst are listed in Tables I and II.

COMPARATIVE EXAMPLE A

A catalyst was prepared using a conventional dry pore volume impregnation technique. A solution suitable for impregnating 100 grams of a gamma alumina carrier was prepared as follows. A solution was prepared by adding 30.28 grams of ammonium dimolybdate to 62 milliliters of 24% ammonia. The solution was then heated to 40° C. and stirred in order to effect dissolution of the materials. 7.64 Grams of nickel carbonate was then added to the solution. When the solution became clear, the solution was added to the gamma alumina support in several small portions with intermediate agitations. The impregnated support was further agitated about 5 minutes, dried for 2 hours at 120° C. and calcined in air for 2 hours at 482° C. The properties of the catalyst as listed in Tables I and II.

CATALYST TESTING

Catalyst samples were used to hydrotreat a catalytically-cracked heavy gas oil (CCHGO) in a trickle-flow reactor. Ten ccs of the extruded catalyst were crushed and sieved to a 16–45 mesh, diluted with silicon carbide, and loaded into a typical trickle-flow reactor tube. The catalyst was presulfided with a 5% $H_2S/H_2$ (v/v) gas mixture at 700° F. for 2 hours prior to testing. A CCHGO was passed over the catalyst at 675° F. and 850 psig $H_2$ with a $H_2$/oil equal to 4.0. Rate constants are reported relative to the non-hydrogel catalyst (Comparative Example A) and are calculated on a volumetric basis. Measured rate constants include hydrogenation, denitrification and desulfurization. Specific catalyst performance characteristics are presented in Table III.

TABLE I

| Catalyst Properties | EXAMPLE 1 | COMPARATIVE EXAMPLE A |
|---|---|---|
| Aging pH[a] | 11.0–12.0 | — |
| Density g/cc[b] | 1.10 | 0.76 |
| Reslurry pH[c] | 5.5 | — |
| $N_2$ Surface Area $m^2/g$[d] | 399 | 216 |

TABLE I-continued

| Catalyst Properties | EXAMPLE 1 | COMPARATIVE EXAMPLE A |
|---|---|---|
| $N_2$ Pore Volume cc/g[e] | 0.32 | — |
| % wt. Nickel[f] | 4.6 | 3.2 |
| % wt. Molybdenum[g] | 19.2 | 13.3 |

TABLE II

| Catalyst Pore Size Distributions | | |
|---|---|---|
| Hg Pore[h] Size Dist | EXAMPLE 1 | COMPARATIVE EXAMPLE 1 |
| <50 ang | 88.9 | 2.4 |
| 50–70 ang | 4.7 | 6.3 |
| 70–100 ang | 3.0 | 36.7 |
| 100–150 ang | 1.8 | 42.7 |
| 150–350 ang | 1.6 | 7.9 |
| <350 ang | 0.0 | 4.0 |

[a]Measured using an Orion 231 pH meter and Orion electrodes.
[b]209 cc volume fully settled in a graduated cup and weighed.
[c]Measured using an Orion 231 pH meter and Orion electrodes.
[d]BET (Brunauer, S., Emmet, P. Y. and Teller, E. J. Am. Chem. Soc., 60, 309–316 (1938)) by nitrogen adsorption/desorption, Micromeritics Digisorb 2500 Instrument.
[e]By nitrogen adsorption, Micromeritics Digisorb 2500 Instrument.
[f]Weight percent determined by neutron activation analysis or atomic absorption spectroscopy.
[g]Weight percent determined by neutron activation analysis or atomic absorption spectroscopy.
[h]Determined by mercury intrusion, to 60,000 psi using a Micromeritics Autopore 9210, using a 130°contact angle and 0.473 N/m surface tension of mercury. Numbers listed are percent pore volume.

TABLE III

| Specific Catalyst Performance | | | |
|---|---|---|---|
| | CCHGO (VOLUMETRIC BASIS) | | |
| | H | N | S |
| Example 1 | 1.12 | 1.39 | 1.42 |
| Comparative Example A | 1.00 | 1.00 | 1.00 |

I claim as my invention:

1. A process for hydrotreating hydrocarbon feeds by contacting said feeds at a temperature in the range of from about 300° F. to about 900° F. and a pressure in the range of from about 200 psig to about 3500 psig with a catalyst having a surface area of at least about 300 $m^2/g$ and at least about 70% of the pore volume in pores having diameters less than about 70 Å, wherein said catalyst is prepared by a process which comprises:
   (a) titrating an aqueous solution of one or more aluminum salt(s) with a titrating agent, thereby forming a precipitate,
   (b) aging the precipitate at a temperature ranging from about 20° C. to about 90° C. for at least about 15 minutes at a pH ranging from about 8.0 to about 12.0,
   (c) washing the precipitate,
   (d) mixing the precipitate with salts of nickel and salts of a heavy metal selected from the group consisting of molybdenum, tungsten, and mixtures thereof, at a pH in the range between about 4.0 and about 10.0 and a temperature in the range between about 25° C. and about 100° C. until adsorption of the metal salts onto the precipitate is sufficient to yield a final catalyst having from about 1%w to about 6%w nickel and from about 8%w to about 40%w heavy metal,
   (e) extruding the product of step (d), and (f) drying and calcining the product of step (e) at a temperature ranging from about 300° C. to about 900° C.

2. The process of claim 1 wherein the precipitation is carried out at a pH in the range between about 5.5 and about 10.0.

3. The process of claim 1 wherein the precipitation is carried out at a temperature between about 20° C. and about 90° C.

4. The process of claim 1 wherein the aging pH is in the range between about 10.0 and about 12.0.

5. The process of claim 1 wherein step d) is carried out at a pH in the range between about 4.0 and about 9.0.

6. The process of claim 1 wherein said catalyst contains from about 3%w to about 5% w nickel and from about 8%w to about 22%w molybdenum.

7. A process for hydrotreating hydrocarbon feeds by contacting said feeds at a temperature in the range of from about 300° F. to about 900° F. and a pressure in the range of from about 200 psig to about 3500 psig with a catalyst having a surface area of at least about 300 m²/g and at least about 70% of the pore volume in pores having diameters less than about 70 Å, wherein said catalyst is prepared by a process which comprises:
(a) precipitating an aqueous solution of one or more aluminum salt(s) by adjusting the pH of said solution of a range between about 5.5 and about 10.0 and a temperature in the range between about 20° C. and about 90° C., thereby forming a precipitate,
(b) aging the precipitate at a temperature ranging from about 20° C. to about 90° C. for at least about 15 minutes at a pH ranging from about 8.0 to about 12.0,
(c) washing the precipitate,
(d) mixing the precipitate with one or more solution(s) containing salts of nickel and a heavy metal selected from the group consisting of molybdenum, tungsten, and mixtures thereof, at a pH in the range between about 4.0 and about 10.0 and a temperature in the range between about 25° C. and about 100° C. until adsorption of the metal salts onto the precipitate is sufficient to yield a final catalyst having from about 1%w to about 6%w nickel and from about 8%w to about 40%w heavy metal,
(e) extruding the product of step (d), and
(f) drying and calcining the product of step (e) at a temperature ranging from about 300° C. to about 900° C.

8. The process of claim 7 wherein the precipitation is carried out at a pH in the range between about 5.5 and about 8.0.

9. The process of claim 7 wherein the precipitation is carried out at a temperature between about 50° C. and about 85° C.

10. The process of claim 7 wherein the aging pH is in the range between about 10.0 and about 12.0.

11. The process of claim 7 wherein step d) is carried out at a pH in the range between about 4.0 and about 9.0.

12. The process of claim 7 wherein said catalyst contains from about 3%w to about 5%w nickel and from about 8%w to about 22%w molybdenum.

13. A process for hydrotreating hydrocarbon feeds by contacting said feeds at a temperature in the range of from about 300° F. to about 900° F. and a pressure in the range of from about 200 psig to about 3500 psig with a catalyst having a surface area of at least about 300 m²/g and at least about 70% of the pore volume in pores having diameters less than about 70 Å, wherein said catalyst is prepared by a process which comprises:
(a) precipitating an aqueous solution of one or more aluminum salt(s) by adjusting the pH of said solution of a range between about 5.5 and about 10.0 and a temperature in the range between about 20° C. and about 90° C., thereby forming a precipitate,
(b) aging the precipitate at a temperature ranging from about 20° C. to about 90° C. for at least about 15 minutes at a pH ranging from about 8.0 to about 12.0,
(c) washing the precipitate,
(d) mixing the precipitate with dry, water-soluble salts of nickel and dry, water-soluble salts of a heavy metal selected from the group consisting of molybdenum, tungsten, and mixtures thereof, at a pH in the range between about 4.0 and about 10.0 and a temperature in the range between about 25° C. and about 100° C. to yield a final catalyst having from about 1%w to about 6%w nickel and from about 8%w to about 40%w heavy metal,
(e) extruding the product of step (d), and
(f) drying and calcining the product of step (e) at a temperature ranging from about 300° C. to about 900° C.

14. The process of claim 13 wherein the precipitation is carried out at a pH in the range between about 5.5 and about 8.0.

15. The process of claim 12 wherein the precipitation is carried out at a temperature between about 50° C. and about 85° C.

16. The process of claim 13 wherein the aging pH is in the range between about 10.0 and about 12.0.

17. The process of claim 13 wherein step d) is carried out at a pH in the range between about 4.0 and about 9.0.

18. The process of claim 13 wherein said catalyst contains from about 3%w to about 5%w nickel and from about 8%w to about 22%w molybdenum.

19. A process for hydrotreating hydrocarbon feeds by contacting said feeds at a temperature in the range of from about 300° C. to about 900° F. and a pressure in the range of from about 200 psig to about 3500 psig with a catalyst having a surface area of at least about 300 m²/g and at least about 70% of the pore volume in pores having diameters less than about 70 Å, wherein said catalyst is prepared by a process which comprises:
(a) titrating an aqueous solution of an acid aluminum salt with an aqueous solution of a basic aluminum compound at a pH in the range between about 5.5 and about 10.0 and a temperature in the range between 20° C. and about 90° C., thereby forming a precipitate,
(b) aging the precipitate at a temperature ranging from about 20° C. to about 90° C. for at least about 15 minutes at a pH ranging from about 8.0 to about 12.0,
(c) washing the precipitate,
(d) mixing the precipitate with one or more solution(s) containing salts of nickel and a heavy metal selected from the group consisting of molybdenum, tungsten, and mixtures thereof, at a pH in the range between about 4.0 and about 10.0 and a temperature in the range between about 25° C. and about 100° C. until adsorption of the metal salts onto the precipitate is sufficient catalyst to yield a final catalyst having from about 1%w to about 6%w nickel and from about 8%w to about 40%w heavy metal,
(e) extruding the product of step (d), and
(f) drying and calcining the product of step (e) at a temperature ranging from about 300° C. to about 900° C.

20. The process of claim 19 wherein the precipitation is carried out at a pH in the range between about 5.5 and about 8.0.

21. The process of claim 19 wherein the precipitation is carried out at a temperature between about 50° C. and about 85° C.

22. The process of claim 19 wherein the aging pH is in the range between about 10.0 and about 12.0.

23. The process of claim 19 wherein step (d) is carried out at a pH in the range between about 4.0 and about 9.0.

24. The process of claim 19 wherein said catalyst contains from about 3%w to about 5%w nickel and from about 8%w to about 22%w molybdenum.

25. A process for hydrotreating hydrocarbon feeds by contacting said feeds at a temperature in the range of from about 300° F. to about 900° F. and a pressure in the range of from about 200 psig to about 3500 psig with a catalyst having a surface area of at least about 300 m$^2$/g and at least about 70% of the pore volume in pores having diameters less than about 70A, wherein said catalyst is prepared by a process which comprises:
(a) titrating an aqueous solution of an acid aluminum salt with an aqueous solution of a basic aluminum compound at a pH in the range between about 5.5 and about 10.0 and a temperature in the range between 20° C. and about 90° C., thereby forming a precipitate,
(b) aging the precipitate at a temperature ranging from about 20° C. to about 90° C. for at least about 15 minutes at a pH ranging from about 8.0 to about 12.0,
(c) washing the precipitate,
(d) mixing the precipitate with dry, water-soluble salts of nickel and dry, water-soluble salts of a heavy metal selected from the group consisting of molybdenum, tungsten, and mixtures thereof, at a pH in the range between about 4.0 and about 10.0 and a temperature in the range between about 25° C. and about 100° C. to yield a final catalyst having from about 1%w to about 6%w nickel and from about 8%w to about 40%w heavy metal,
(e) extruding the product of step (d), and
(f) drying and calcining the product of step (e) at a temperature ranging from about 300° C. to about 900° C.

26. The process of claim 25 wherein the precipitation is carried out at a pH in the range between about 5.5 and about 8.0

27. The process of claim 25 wherein the precipitation is carried out at a temperature between about 50° C. and about 85° C.

28. The process of claim 25 wherein the aging pH is in the range between about 10.0 and about 12.0.

29. The process of claim 25 wherein said step (d) is carried out at a pH in the range between about 4.0 and about 9.0.

30. The process of claim 25 wherein said catalyst contains from about 3%w to about 5%w nickel and from about 8%w to about 22%w molybdenum.

31. A process for hydrotreating hydrocarbon feeds by contacting said feeds at a temperature in the range of from about 300° F. to about 900° F. and a pressure in the range of from about 200 psig to about 3500 psig with a catalyst having a surface area of at least about 300 m$^2$/g and at least about 70% of the pore volume in pores having diameters less than about 70 Å, wherein said catalyst is prepared by a process which comprises:
(a) titrating an aqueous solution of an acid aluminum salt selected from the group consisting of aluminum sulfate, aluminum nitrate and aluminum chloride, with an aqueous solution of a basic aluminum compound selected from the group consisting of sodium aluminate and potassium aluminate, at a pH in the range between about 5.5 and about 8.0 and a temperature in the range between about 20° C. and about 90° C., thereby forming a precipitate,
(b) aging the precipitate at a temperature ranging from about 20° C. to about 90° C. for at least about 15 minutes at a pH ranging from about 10.0 to about 12.0,
(c) washing the precipitate,
(d) mixing the precipitate with one or more solution(s) containing molybdate or dimolybdate salts and nickel salts at a pH in the range between about 40 and about 9.0 and a temperature in the range between about 25° C. and about 100° C. until adsorption of the metal salts onto the precipitate is sufficient to yield a final catalyst having from about 3%w to about 5%w nickel and from about 14%w to about 20%w molybdenum,
(e) extruding the product of step (d), and
(f) drying and calcining the product of step (e) at a temperature ranging from about 300° C. to about 900° C.

32. A process for hydrotreating hydrocarbon feeds by contacting said feeds at a temperature in the range of from about 300° F. to about 900° F. and a pressure in the range of from about 200 psig to about 3500 psig with a catalyst having a surface area of at least about 300 m$^2$/g and at least about 70% of the pore volume in pores having diameters less than about 70 Å, wherein said catalyst is prepared by a process which comprises:
(a) titrating an aqueous solution of an acid aluminum salt selected from the group consisting of aluminum sulfate, aluminum nitrate and aluminum chloride, with an aqueous solution of a basic aluminum compound selected from the aluminate, at a pH in the range between about 5.5 and about 8.0 and a temperature in the range between about 20° C. and about 90° C., thereby forming a precipitate,
(b) aging the precipitate at a temperature ranging from about 20° C. to about 90° C. for at least about 15 minutes at a pH ranging from about 10.0 to about 12.0,
(c) washing the precipitate,
(d) mixing the precipitate with dry, water-soluble nickel salts and dry, water-soluble molybdate or dimolybdate salts at a pH in the range between about 4.0 and about 9.0 and a temperature in the range between about 25° C. and about 100° C. to yield a final catalyst having from about 3%w to about 5%w nickel and from about 14%w to about 20%w molybdenum,
(e) extruding the product of step (d), and
(f) drying and calcining the product of step (e) at a temperature ranging from about 300° C. to about 900° C.

33. A process for hydrotreating hydrocarbon feeds by contacting said feeds at a temperature in the range of from about 300° F. to about 900° F. and a pressure in the range of from about 200 psig to about 3500 psig with a catalyst having a surface area of at least about 300 m²/g and at least about 70% of the pore volume in pores having diameters less than about 70 Å, wherein said catalyst is prepared by a process which comprises:
- (a) titrating an aqueous solution of an acid aluminum salt selected from the group consisting of aluminum sulfate, aluminum nitrate and aluminum chloride, with an aqueous solution of a base at a pH in the range between about 5.5 and about 8.0 and a temperature in the range between about 20° C. and about 90° C., thereby forming a precipitate,
- (b) aging the precipitate at a temperature ranging from about 20° C. to about 90° C. for at least about 15 minutes at a pH ranging from about 10.0 to about 12.0,
- (c) washing the precipitate,
- (d) mixing the precipitate with one or more solution(s) containing molybdate or dimolybdate salts and nickel salts at a pH in the range between about 4.0 and about 9.0 and a temperature in the range between about 25° C. and about 100° C. until adsorption of the metal salts onto the precipitate is sufficient to yield a final catalyst having from about 3%w to about 5%w nickel and from about 14%w to about 20%w molybdenum,
- (e) extruding the product of step (d), and
- (f) drying and calcining the product of step (e) at a temperature ranging from about 300° C. to about 900° C.

34. A process for hydrotreating hydrocarbon feeds by contacting said feeds at a temperature in the range of from bout 300° F. to about 900° F. and a pressure in the range of from about 200 psig to about 3500 psig with a catalyst having a surface volume in pores having diameters less than about 70 Å, wherein said catalyst is prepared by a process which comprises:
- (a) titrating an aqueous solution of an acid aluminum salt selected from the group consisting of aluminum sulfate, aluminum nitrate and aluminum chloride, with an aqueous solution of a base at a pH in the range between about 5.5 and about 8.0 at a temperature in the range between about 20° C. and about 90° C., thereby forming a precipitate,
- (b) aging the precipitate at a temperature ranging from about 20° C. to about 90° C. for at least about 15 minutes at a pH ranging from about 10.0 to about 12.0,
- (c) washing the precipitate,
- (d) mixing the precipitate dry, water-soluble nickel salts and dry, water-soluble molybdate or dimolybdate salts at a pH in the range between about 25° C. and about 100° C. to yield a final catalyst having from about 3%w to about 5%w nickel and from about 14%w to about 20%w molybdenum,
- (e) extruding the product of step (d), and
- (f) drying and calcining the product of step (e) at a temperature ranging from about 300° C. to about 900° C.

35. A process for hydrotreating hydrocarbon feeds by contacting said feeds at a temperature in the range of from about 300° F. to about 900° F. and a pressure in the range of from about 200 psig to about 3500 psig with a catalyst having a surface area of at least about 300 m²/g and at least about 70% of the pore volume in pores having diameters less than about 70 Å, wherein said catalyst is prepared by a process which comprises:
- (a) titrating an aqueous solution of an acid with an aqueous solution of a basic aluminum compound selected from the group consisting of sodium aluminate and potassium aluminate at a pH in the range between about 5.5 and about 8.0 and a temperature in the range between about 20° C. and about 90° C., thereby forming a precipitate,
- (b) aging the precipitate at a temperature ranging from about 20° C. to about 90° C. for at least about 15 minutes at a pH ranging from about 10.0 to about 12.0,
- (c) washing the precipitate,
- (d) mixing the precipitate with one or more solution(s) containing molybdate or dimolybdate salts and nickel salts at a pH in the range between about 4.0 and about 9.0 and a temperature in the range between about 25° C. and about 100° C. until adsorption of the metal salts onto the precipitate is sufficient to yield a final catalyst having from about 3%w to about 5%w nickel and from about 14%w to about 20%w molybdenum,
- (e) extruding the product of step (d), and
- (f) drying and calcining the product of step (e) at a temperature ranging from about 300° C. to about 900° C.

36. A process for hydrotreating hydrocarbon feeds by contacting said feeds at a temperature in the range of from about 300° F. to about 900° F. and a pressure in the range of from about 200 psig to about 3500 psig with a catalyst having a surface area of at least about 300 m²/g and at least about 70% of the pore volume in pores having diameters less than about 70 Å, wherein said catalyst is prepared by a process which comprises:
- (a) titrating an aqueous solution of an acid with an aqueous solution of a basic aluminum compound selected from the group consisting of sodium aluminate and potassium aluminate, at a pH in the range between about 5.5 and about 8.0 at a temperature in the range between about 20° C. and about 90° C., thereby forming a precipitate,
- (b) aging the precipitate at a temperature ranging from bout 20° C. to about 90° C. for at least about 15 minutes at a pH ranging from about 10.0 to about 12.0,
- (c) washing the precipitate,
- (d) mixing the precipitate with dry, water-soluble nickel salts and dry, water-soluble molybdate or dimolybdate salts at a pH in the range between about 4.0 and about 9.0 and a temperature in the range between about 25° C. and about 100° C. to yield a final catalyst having from about 3%w to about 5%w nickel and from about 14%w to about 20%w molybdenum,
- (e) extruding the product of step (d), and
- (f) drying and calcining the product of step (e) at a temperature ranging from about 300° C. to about 900° C.

* * * * *